United States Patent [19]

Welch et al.

[11] 3,724,208
[45] Apr. 3, 1973

[54] FRICTION DEVICE FOR HYDRODYNAMIC UNIT ROTOR

[75] Inventors: Earl S. Welch, Huntington Woods; Roland J. Petelka, Ypsilanti, both of Mich.

[73] Assignee: General Motors Corporation, Detroit, Mich.

[22] Filed: Apr. 2, 1971

[21] Appl. No.: 130,584

[52] U.S. Cl. .................................................60/54
[51] Int. Cl. ............................................F16d 31/06
[58] Field of Search...........................................60/54

[56] References Cited

UNITED STATES PATENTS

| | | | |
|---|---|---|---|
| 2,735,267 | 2/1956 | Tuck | 60/54 |
| 3,152,446 | 10/1964 | Foerster et al. | 60/54 |
| 3,507,118 | 4/1970 | Yamaguchi et al. | 60/54 |

Primary Examiner—Edgar W. Geoghegan
Attorney—W. E. Finken, A. M. Heiter and Charles R. White

[57] ABSTRACT

Hydrodynamic torque converter in which the stator is mounted on a cone-type friction device having a first cone member fixed to a ground sleeve and a second cone member which carries the stator. The second cone member is supported on the first cone member and is moved into and out of frictional engagement in accordance with the flow conditions within the converter. At stall and up to coupling, the flow of fluid through the converter acts on the front faces of the stator blades to provide a force which effects the frictional engagement of the friction device so that the stator is grounded to provide for reaction and torque multiplication. As turbine speeds increase to pump speed, the fluid exiting from the turbine flows against the rear faces of the stator blades removing the apply force allowing the stator to freewheel so that the converter operates as a fluid coupling.

4 Claims, 4 Drawing Figures

PATENTED APR 3 1973 3,724,208

INVENTORS
Earl S. Welch, &
BY Roland J. Petelka
Charles R. White
ATTORNEY

FRICTION DEVICE FOR HYDRODYNAMIC UNIT ROTOR

This invention relates to hydrodynamic torque transmitting units and more particularly to a friction device advantageously utilizing fluid flow forces occurring within a hydrodynamic unit for connecting and disconnecting a unit rotor and a ground member.

One-way friction devices have been employed in hydrodynamic torque converters to prevent rotation of the stator in one direction so that the stator will be stationary and provide the reaction allowing the converter to multiply input torque. As the turbine speed increases up to pump speed, the fluid flow within the converter changes in a manner to effect the release of the one-way device so that the stator overruns to provide a coupling phase of operation.

Prior to the present invention, roller or sprag type one-way devices have usually been employed in torque converters to automatically connect and disconnect the stator and the ground sleeve. While these one-way devices have been completely satisfactory in operation, they employ a large number of precision made components such as rollers or sprags which work in inner and outer races. These one-way devices are expensive since they have to be made with special metals and to close tolerances. Prior attempts to replace these one-way friction devices with alternative devices have met with only limited success since they usually involve costly and complex arrangements and often their performances are not as good as the roller and sprag type devices.

With this invention, the conventional one-way device such as sprag and roller one-way units can be readily replaced by a two-piece cone type friction device that is released and engaged in accordance with the fluid flow conditions within the converter. In the preferred form of this invention a first cone clutch is fixed to the ground sleeve of a torque converter and a second cone clutch which carries the stator element is rotatably and slidably mounted on a shoulder of the first cone clutch. From stall up to coupling, the oil flow through the converter acts on the front face of stator blades to bias the second cone clutch into clutching engagement with the first cone clutch. Under these conditions the stator element will be grounded for reaction and the converter multiplies input torque. As turbine speed increases and approaches the speed of the pump, the oil leaving the turbine flows against the rear face of the stator blades thereby removing the clutch apply force. This allows the second cone clutch element and the stator to revolve freely on the first cone clutch element and in the direction of the rotary flow of converter oil so that the converter operates as a fluid coupling.

It is an object of this invention to provide a new and improved flow controlled friction device for grounding and releasing a rotor in a hydrodynamic torque transmitting unit.

Another object of this invention is to provide a new and improved friction device for a torque converter stator which incorporates a pair of cone friction members controlled by the flow of oil within the converter; the cone members are relatively moved longitudinally into clutching engagement under predetermined oil flow conditions within the converter so that the stator is grounded permitting the converter to multiply torque. Subsequently, as turbine speed approaches pump speed, the oil flow changes to effect release of the friction members so that the stator can freewheel permitting the converter to function as a fluid coupling.

Another object of this invention is to provide a torque converter in which the stator is mounted on a new and improved cone-type friction device that incorporates a minimum number of parts and is automatic in operation being engaged and released in accordance with the fluid flow conditions within the converter, to produce optimum efficiency of converter operation during coupling.

Another object of this invention is to provide a new and improved one-way locking device for a bladed rotor in a hydrodynamic unit which (1) makes advantageous use of hydrodynamic thrust forces occurring on the blades of the rotor during operation of the hydrodynamic unit to lock the device so that the rotor is held from rotation and (2) eliminates triggering mechanisms and parasitic drag present in other one-way locking devices when the rotor is released for rotation by the locking device.

These and other objects of the invention will become more apparent from the following drawings and detailed description in which.

Figures 1, 2:
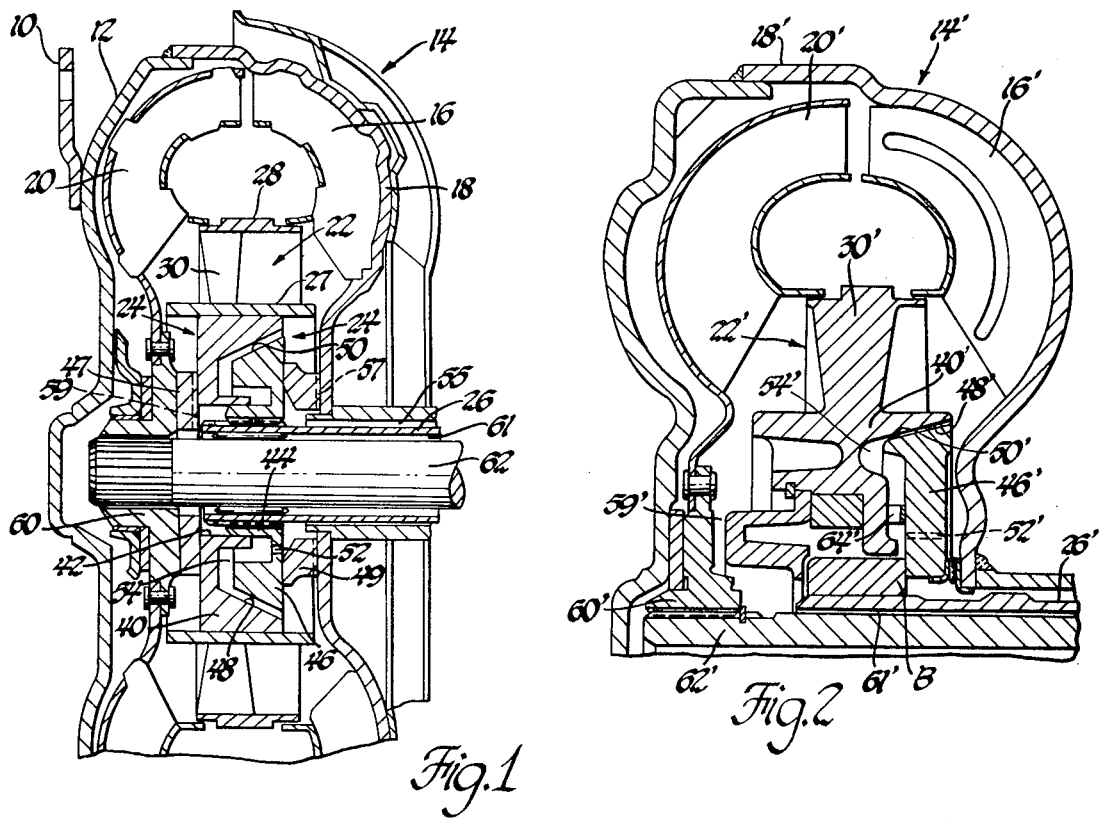
FIG. 1 is a side sectional view of a hydrodynamic torque converter illustrating one embodiment of the invention.
FIG. 2 is a side sectional view of a hydrodynamic torque converter illustrating another embodiment of the invention.
Figure 3:
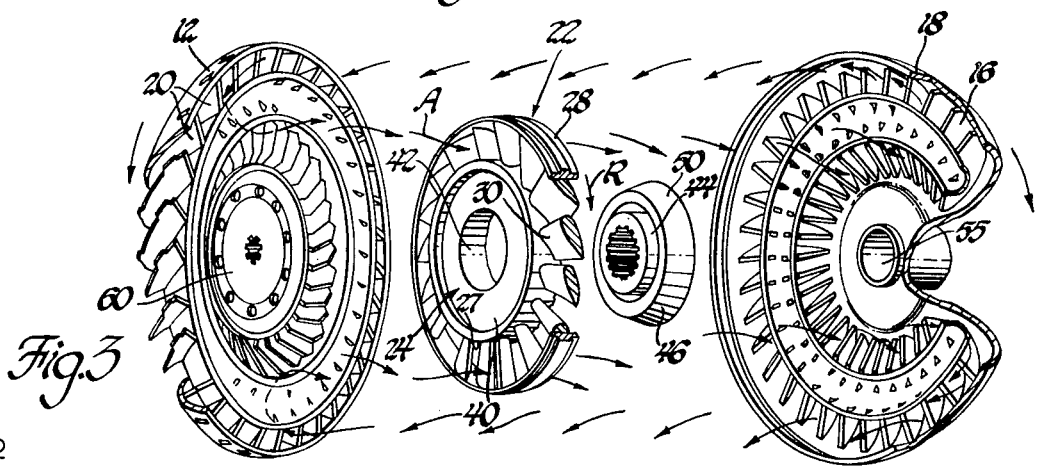
FIG. 3 is an exploded view of the torque converter of FIG. 1 showing the path of converter oil flow during the coupling phase of operation.

As shown in FIG. 1 there is input lug 10 which is drivingly connected to the front cover 12 of a hydrodynamic torque converter 14. The torque converter has a bladed pump 16 operatively connected to the housing 18 driven through front cover 12, a bladed turbine 20 and a bladed stator assembly 22. This stator assembly 22 is mounted on a flow-controlled friction device 24 that is operatively connected to a rounded sleeve 26. The stator assembly has inner and outer shrouds 27 and 28 between which stator blades 30 are positioned at a predetermined angle as best shown in FIG. 3. The inner shroud of the stator is mounted on, and is secured to, the outer periphery of a first friction member or hub 40 of the flow-controlled friction device 24. This friction member has an inner cylindrical sleeve 42 which slidably fits on an extending, cylindrical hub 44 of a second friction member or hub 46 of friction device 24 which is splined to the grounded sleeve 26. As shown, the two friction members are located between the annular spacers 47 and 49 disposed within the converter, which function as bearings and spacers. In the disengaged position shown, the first or rotary friction member 40 engages spacer 47 to limit release or disengaging movement.

The first friction member 40 has an internal conical friction surface 48 which can be moved from the disengaged position shown into mating engagement with an external conical friction surface 50 of the friction member 46. Also, there is an oil passage 52 formed through the side wall of friction member 46 to exhaust oil from the cavity 54 formed by the two friction members when the members are being engaged.

Oil is fed into the converter through supply passage 55 and inlet passages 57 in spacer 49. Oil is discharged from the converter through radial discharge passages 59 in spacer 47 into return passage 61.

The turbine 20 is drivingly connected to a disc-like hub member 60 which is splined to the end of a driven shaft 62. This driven shaft extends from the hub member rearwardly through the grounded sleeve 26 to a suitable gear unit or other drive mechanism not shown.

In operation the first friction member is movable into engagement with the second friction member by a resultant axial force exerted by converter oil on the front faces of the blades 29 of the stator assembly 22. Assuming that the vehicle employing this converter is stationary and the engine is started, the pump 16, driven by the engine, pumps converter oil into the stationary turbine 20. This oil flows through the turbine and is directed by the turbine blades into the front faces of the stator blades, which in turn direct oil back into the pump in a direction to assist pump rotation to thereby provide for converter torque multiplication.

The resultant force exerted by this oil on the stator blades has an axial force component which effects the limited axial movement of clutch member 40 toward the clutch member 46 and the resultant locking frictional engagement of conical clutch surfaces 48 and 50. Under these conditions the stator is held stationary and the converter multiplies input torque. As the turbine begins to rotate to accelerate the vehicle, the angle of attack of oil leaving the turbine on the stator blades gradually diminishes and finally is directed onto the rear faces of the stator blades as indicated by the fluid flow arrows A in FIG. 3. When this occurs, the axial force effecting clutch engagement and the capacity of the cone clutch are reduced to zero and the stator freewheels in the forward direction as illustrated by arrow R in FIG. 3. Under these conditions the converter functions as a fluid coupling. This operation will continue until the turbine speed reduces to a speed less than pump speed and until the oil exiting from the turbine into the stator again is directed onto the front faces of the stator blades to effect engagement of the clutch as described above.

FIG. 2 shows another embodiment of the invention which is similar to the first embodiment but employs a spring between the cone clutch members of the stator to provide a clutch release force to ensure that the clutch releases at coupling without significant parasitic drag. Corresponding parts of the two embodiments are identified with the same reference numerals with those of FIG. 2 being primed.

The torque converter 14' of FIG. 2 has bladed pump 16' driven through converter housing 18' and has a bladed turbine 20' and bladed stator assembly 22'. The turbine drives shaft 62' through hub 60'. The stator assembly has blades 30' and is rotatably mounted on an annular bearing B which is splined to or otherwise secured ground sleeve 26'. Also the stator assembly has a hub or friction member 40' formed with an internal cone clutch surface 48', which can be moved from the disengaged position shown into mating engagement with an external conical surface 50' of the hub or friction member 46'. Member 46' is secured to the annular bearing B and is therefore grounded through the ground sleeve 26'. An oil passage 52', formed through the side walls of the member 46' is provided to exhaust oil from the cavity 54' between the two friction members as the friction members are being moved into engagement. A waved and circular spring member 64' is disposed between the two members 40' and 46' to provide a release force to assist the disengagement of the cone clutch at the coupling point. As in the first embodiment, the converter is filled with oil through inlet passage 26' and oil is discharged through discharge passage 59' and return passage 61'.

In operation the FIG. 2 device operates in a manner similar to that described in connection with the FIG. 1 construction. At stall and up to coupling the axial force of the working fluid exerted on the stator blades causes the axial movement of the stator and the frictional engagement of frictional surfaces 48' and 50' so that the stator is grounded and held for reaction. In this embodiment the spring 64' opposes this movement, however, the engaging force at stall and up to coupling is greater than the force of the spring so that the friction surfaces 48' and 50' are fully engaged. At coupling, when the axial force has sufficiently diminished, the spring 64' effects the quick release of the friction surfaces 48' and 50' without parasitic drag.

In FIGS. 1 and 2, the differential between the pressure in the inlet passage and the outlet passage will, in typical torque converters where the inlet passage pressure is normally less, produce a resultant force in an engaging direction but this force will also be reduced approaching and in the coupling phase as the toric circulation is reduced. In the normal torque converter, the above explained forces on the stator blades provide the major engaging force. The forces acting on the stator hub due to the inlet and outlet pressure differential provide a lesser engaging force. Normally both of these forces act in the same direction. The net sum of these fluid forces and a spring force as shown in FIG. 2, which could be used in FIG. 1, on the complete axially movable stator assembly blades and the hub, is such that during the torque multiplication phase the gradually decreasing clutch engaging force is provided and just before or at initial coupling, these forces automatically release or are low enough to permit the fluid flow induced rotational force on the stator blades to release the clutch to permit freewheeling of the stator.

Figure 4:
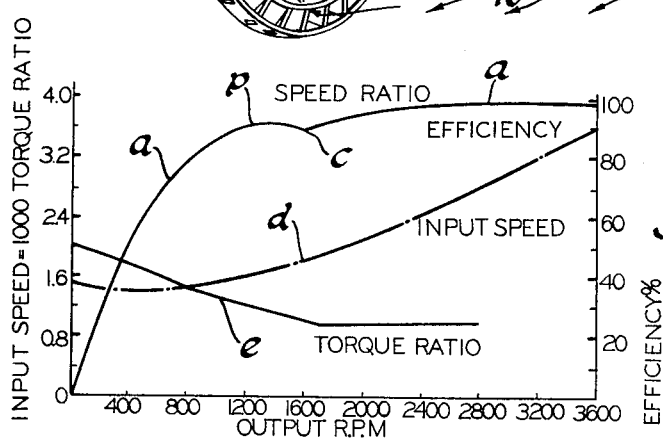
FIG. 4 are curves illustrating the operation of hydrodynamic torque converters.

The operation of this invention is graphically illustrated in FIG. 4. Curve a is an efficiency curve of a converter using the present invention. In the torque-multiplying phase of operation up to the coupling point c, the stator is held for reaction by the cone clutch. At stall, the hydrodynamic efficiency of the converter is zero since there is no turning of the turbine. As the turbine accelerates from stall, the efficiency of the converter increases to an initial peak, i.e., 90 percent as shown by point p. After this, the efficiency slightly decreases to i.e., 87 percent until at coupling point c, the cone clutch releases the stator for rotation and the converter operates in the coupling phase.

It is important for high efficiency operation that freewheeling of the stator should not be held or resisted beyond the coupling point c. The net sum of the axial forces is reduced to zero at the same time as the rotary reaction force is reduced to zero so the first small negative rotary reaction force on the stator can act on a completely free stator for freewheeling of the stator without delay or resistance. The net sum of the axial forces also may reduce to zero just prior to the reduction of the rotary reaction force to zero. This would ensure that the stator is free as the rotary reaction force becomes zero and then negative so freewheeling is immediately initiated with the first small negative rotary force on the stator.

After the stator is released, the efficiency again increases to a very high efficiency to i.e., 97 percent. With this invention, frictional drag present in prior art devices using rollers, tickle springs and sprags, is minimized. Thus, this invention provides for improvement in converter efficiency during the entire coupling phase of operation. Curves d and e are input speed and torque ratio curves for this installation.

This invention is not limited to the details of the construction shown and described for purposes of illustrating the invention for other modifications will occur to those skilled in the art.

What is claimed is:

1. In a hydrodynamic torque transmitting unit having a plurality of bladed rotors which are rotatable about a longitudinal axis, an input operatively connected to a first of said rotors, an output operatively connected to a second of said rotors, a third of said rotors operatively disposed in said unit between said first and second rotors, a ground sleeve extending into said unit, friction means for connecting and disconnecting said third rotor and said ground sleeve, said friction means comprising first and second friction members, said first friction member having a conical friction surface thereon and having a support sleeve extending longitudinally therefrom, said second friction member being mounted for rotary and longitudinal movement with respect to said longitudinal axis on said support sleeve, said second friction member having a conical friction surface thereon for frictionally engaging said first mentioned friction surface, connecting means for connecting said second friction member and said third rotor so that the force of converter fluid circulating in said converter acting on said third rotor in a first operating condition will effect the limited longitudinal movement of said second friction member in one direction and the engagement of said friction surfaces to thereby ground said third rotor and so that the friction surfaces disengage without substantial drag permitting rotation of said third rotor in response to the removal of said fluid forces as said second rotor reaches approximately the speed of said first rotor.

2. The torque transmitting unit of claim 1 and further comprising spring means operatively disposed between said friction members for exerting an axial force on said second friction member to cause the rapid disengagement of said friction surfaces as the rotary speed of said second rotor is substantially equal to the rotary speed of said first rotor so that said third rotor is released for free rotation in said hydrodynamic unit.

3. A hydrodynamic torque converter comprising rotatable and bladed input rotor means, rotatable and bladed output rotor means, rotatable and bladed stator means, a ground member, an engageable and disengageable friction device for connecting and disconnecting said rotatable stator and said ground member, said friction device having first and second friction members, said bladed stator means being operatively secured to said first friction member, each of said friction members having a friction surface, said friction surfaces being disposed adjacent co each other, mounting means securing said second member to said ground sleeve, mounting means for mounting said first friction member for axial sliding movement relative to said second friction member to cause the engagement and disengagement of said friction surfaces of said friction members so that the net sum of the axial forces applied by the circulating fluid within said converter to the blades of said stator causes the frictional engagement of said friction surfaces under torque multiplying operating conditions of said converter to produce a rotary reaction force so that said stator will be connected to ground and multiply the torque applied to said input member and subsequently so that the net sum of the axial forces is reduced to zero at the same time as the rotary reaction force is reduced to zero when the rotary speed of said output rotor means approaches the rotary speed of said input rotor means thereby providing for the free rotation of said stator means in said converter without delay or resistance.

4. A hydrodynamic torque converter comprising rotatable pump means having a plurality of blades, rotatable turbine means having a plurality of blades, rotatable and axially movable stator means, said pump means, said turbine means and said stator means being arranged in a torus to circulate fluid therein in response to rotation of said pump means, a ground member, a single friction unit for connecting said bladed stator to said ground member in response to the rotation of said pump means relative to said turbine means and until said turbine means accelerates from zero up to approximately the speed of said turbine means, said friction unit comprising first friction means fixed to said ground member and second friction means adjacent to said first friction means fixed to said stator means, said stator means having blade means with fluid directing faces that direct the fluid exiting from said turbine means into said pump means from converter stall up to converter coupling and convert a part of the force from fluid circulated through said stator means into an axial force to effect axial movement of said stator means and the frictional engagement of said first and second friction means, said blades being disposed on said stator so that said axial force gradually diminishes to zero as said turbine means approaches the speed of said pump means to effect the disengagement of said friction means to thereby permit said stator to rotate with said circulating fluid so that said converter enters the coupling phase of operation.

* * * * *